(12) United States Patent
Hatch

(10) Patent No.: US 7,633,437 B2
(45) Date of Patent: Dec. 15, 2009

(54) METHOD FOR USING THREE GPS FREQUENCIES TO RESOLVE WHOLE-CYCLE CARRIER-PHASE AMBIGUITIES

(75) Inventor: Ronald R. Hatch, Wilmington, CA (US)

(73) Assignee: Navcom Technology, Inc., Torrance, CA (US)

( * ) Notice: Subject to any disclaimer, the term of this patent is extended or adjusted under 35 U.S.C. 154(b) by 187 days.

(21) Appl. No.: 11/525,756

(22) Filed: Sep. 22, 2006

(65) Prior Publication Data

US 2008/0122688 A1    May 29, 2008

(51) Int. Cl.
   *G01H 1/00*     (2006.01)
(52) U.S. Cl. .................................. 342/357.06
(58) Field of Classification Search ................................ 342/357.01–357.17
   See application file for complete search history.

(56) References Cited

U.S. PATENT DOCUMENTS

| | | | |
|---|---|---|---|
| 5,148,179 A | 9/1992 | Allison | 342/357.03 |
| 5,359,332 A | 10/1994 | Allison et al. | 342/357.04 |
| 5,903,654 A | 5/1999 | Milton et al. | 342/357.02 |
| 6,934,632 B2 * | 8/2005 | Hatch | 701/213 |
| 7,117,417 B2 * | 10/2006 | Sharpe et al. | 714/746 |
| 7,432,853 B2 * | 10/2008 | Vollath | 342/357.04 |
| 2006/0164297 A1 * | 7/2006 | Hernandez-Pajares et al. | 342/357.03 |

FOREIGN PATENT DOCUMENTS

WO   2005/036202   4/2005

OTHER PUBLICATIONS

Simsky, A., "Three's the Charm: Triple Frequency Combinations in Future GNSS," Inside GNSS Magazine, Jul./Aug. 2006, pp. 38-41.
Bonillo-Martinez, C., et al., "The Benefits of the GPS Three Frequencies on the Ambiguity Resolution Techniques," ION GPS '99, Nashville, TN, Sep. 14-17, 1999, pp. 1737-1746.
Colombo, O., et al., "Resolving Carrier-Phase Ambiguities on the Fly, At More Than 100 km From Nearest Reference Site, With the Help of Ionospheric Tomography," ION GPS '99, Nashville, TN, Sep. 14-17, 1999, pp. 1635-1642.

(Continued)

*Primary Examiner*—Thomas H Tarcza
*Assistant Examiner*—Nga X Nguyen
(74) *Attorney, Agent, or Firm*—Morgan, Lewis & Bockius LLP

(57) ABSTRACT

A new three-frequency technique for obtaining geometry free, refraction-corrected, ambiguity-resolved, carrier-phase measurements has been described. First, the ambiguities on at least two wide-lane carrier-phase measurement differences are obtained by averaging the corresponding frequency weighted code measurements. These two ambiguity-resolved measurements are then combined into a composite refraction-corrected measurement. The resulting composite measurement is quite noisy due to the amplification of the multipath noise in the original carrier-phase measurements. But this noisy refraction-corrected carrier-phase measurement can be smoothed with another minimum-noise, refraction-corrected carrier-phase composite measurement. The minimum-noise, refraction-corrected composite measurement is constructed from the primary carrier-phase measurements prior to resolving their whole-cycle ambiguities. By smoothing the difference in the two refraction-corrected measurements, the noise can be reduced and the bias in the low-noise measurement (due to incorrect ambiguities) can be estimated and subsequently corrected.

19 Claims, 4 Drawing Sheets

OTHER PUBLICATIONS

Colombo, O., et al., "Ionospheric Tomography Helps Resolve GPS Ambiguities on the Fly at Distances of Hundreds of Kilometers During Increased Geomagnetic Activity," Presented at the IEEE "Plans 2000" Meeting, San Diego, Mar. 13-16, 2000.

Ericson, S., "A Study of Linear Phase Combinations in Considering Future Civil GPS Frequencies," ION NTM, 1999, pp. 677-686.

Feng, Y., et al., "A Long Range Dynamic GPS Positioning System and its Test Results," Position Location and Navigation Symposium 1996, IEEE, Atlanta, GA, Apr. 1996, pp. 711-717.

Forsell, B., et al., "Carrier Phase Ambiguity Resolution in GNSS-2," ION GPS, 1997, pp. 1727-1736.

Han, S., et al., "The Impact of Two Additional Civilian GPS Frequencies on Ambiguity Resolution Strategies," ION $55^{th}$ Annual Meeting, Cambridge, MA, Jun. 28-30, 1999, pp. 315-321.

Hatch, R., "The Promise of a Third Frquency," GPS World, May 1996, pp. 55-58.

Hatch, R., et al., "Civilian GPS: The Benefits of Three Frequencies," GPS Solutions, vol. 3, No. 4, 2000, pp. 1-9.

Hernandez -Pajares, M., et al., "Impact of Real-Time Ionospheric Determination on Improving Precise Navigation with Galileo and Next-Generation GPS," ION GPS 2002, Portland, OR, Sep. 24-27, 2002, pp. 2756-2767.

Isshiki, H., "An Application of Wide-Lane to Long Baseline GPS Measurements (3)," ION GPS, 2003.

Jung, J., "Optimization of Cascade Integer Resolution with Three Civil GPS Frequencies"; ION GPS 2000, Salt Lake City, UT, Sep. 19-22, 2000, pp. 2191-2200.

Raquet, J., et al., "Long Distance Kinematic Carrier-Phase Ambiguity Resolution Using a Simulated Reference Receiver Network," ION GPS-97, Kansas City, Missouri, Sep. 1997, pp. 1-10.

Sinko, J., "A Compact Earth Tides Algorithm for WADGPS," ION GPS -1995, pp. 35-44.

Teunissen, P., et al., "A Comparison of TCAR, CIR and LAMBDA GNSS Ambiguity Resolution," ION GPS 2002, Portland, OR, Sep. 24-27, 2002, pp. 2799-2808.

Vollath, U., et al., "Analysis of Three-Carrier Ambiguity Resolution (TCAR) Technique for Precise Relative Positioning in GNSS-2," ION GPS, 1998, pp. 417-426.

Werner, W., et al., "Performance of the TCAR Method in Multipath and Jamming Environments," ION GPS, 1998, pp. 1385-1394.

* cited by examiner

METHOD FOR USING THREE GPS FREQUENCIES TO RESOLVE WHOLE-CYCLE CARRIER-PHASE AMBIGUITIES

The present invention relates generally to receivers and methods of determining an object's position in positioning systems, such as the Global Positioning System (GPS) or the European Galileo System, and in particular, to methods of resolving whole-cycle ambiguities in carrier-phase measurements in the positioning systems using three frequencies.

BACKGROUND

A wide-area positioning system, such as the global positioning system (GPS), uses a constellation of satellites to position or navigate objects on earth. Currently, the constellation of satellites broadcast signals at two carrier frequencies, L1 frequency at (154*10.23 MHz) or 1575.42 MHz and L2 frequency at (120*10.23 MHz) or 1227.6 MHz, which correspond to an L1 wavelength of 0.1903 m and L2 wavelength of 0.2442 m, respectively. For each carrier frequency, two types of measurements are usually made by a GPS receiver with an object to be positioned. The two types of measurements are pseudorange measurement and integrated carrier phase measurement. The pseudorange measurement (or code measurement) is a basic GPS observable that all types of GPS receivers can make. It utilizes the C/A or P codes modulated onto the carrier signals. The carrier phase measurement is obtained by integrating a reconstructed carrier of the signal as it arrives at the receiver. Because of an unknown number of whole cycles in transit between the satellite and the receiver when the receiver starts tracking the carrier phase of the signal, there is a whole-cycle ambiguity in the carrier phase measurement. This whole-cycle ambiguity must be resolved in order to achieve high accuracy in the carrier-phase measurement.

With the measurements available, the range or distance between a GPS receiver and each of a plurality of satellites is calculated by multiplying a signal's travel time by the speed of light. These ranges are usually referred to as pseudoranges (false ranges) because the measurements may include errors due to various error factors, such as satellite clock timing error, ephemeris error, ionospheric and tropospheric refraction effects, receiver tracking noise and multipath error, etc. To eliminate or reduce these errors, differential operations are typically used in GPS applications. Differential GPS (DGPS) operations typically involve a base reference GPS receiver, a user GPS receiver, and a communication mechanism between the user and reference receivers. The reference receiver is placed at a known location and the known position is used to generate corrections associated with some or all of the above error factors. The corrections generated or raw data measured at the reference station are supplied to the user receiver, which then uses the corrections or raw data to appropriately correct its computed position. Differential operations using carrier-phase measurements are often referred to as real-time kinematic (RTK) positioning/navigation operations.

The corrections generated or raw data measured at the reference receiver, however, are useful at the user GPS receiver only when there are spatial and temporal correlations of the errors at the reference receiver and the user receiver. While the GPS satellite clock timing error, which appears as a bias on the pseudorange or carrier phase measurement, is perfectly correlated between the reference receiver and the user receiver, most of the other error factors are either not correlated or the correlation diminishes in wide-area applications, i.e., when the distance between the reference and user receivers becomes large. Moreover, when the distance between the user receiver and the reference receiver becomes large, such as more than about 10 to 20 kilometers, the two carrier frequencies in the existing GPS system are inadequate to resolve the whole-cycle carrier-phase ambiguities.

SUMMARY

The present invention includes a method for generating an ambiguity-resolved, refraction-corrected, and minimum-noise carrier-phase measurement. In one embodiment, a first wide-lane ambiguity-resolved, refraction-corrected composite carrier-phase measurement is formed using primary carrier-phase measurements on three carrier frequencies. A second minimum-noise, refraction-corrected composite carrier-phase measurement is formed using the primary carrier-phase measurements. Finally, the first composite carrier-phase measurement is smoothed with the second composite carrier-phase measurement.

In some embodiments, the second composite measurement includes an unresolved whole-cycle ambiguity. The whole-cycle ambiguity is resolved by first estimating a refraction-corrected wavelength for the second composite measurement. A smoothed offset value is determined by differencing the first and second composite measurements. Next, the smoothed offset value is divided by the refraction-corrected wavelength. The result is then rounded to a nearest integer as the whole-cycle ambiguity. The ambiguity-resolved, refraction-corrected, and minimum-phase composite measurement is achieved by summing the second composite measurement and a multiplying result of the refraction-corrected wavelength and the whole-cycle ambiguity.

The ability to resolve the ambiguities of refraction-corrected, composite measurements will largely remove baseline separation limitations in the use of carrier-phase Differential GPS, so that a global RTK capability becomes feasible.

DETAILED DESCRIPTION

Figure 1:
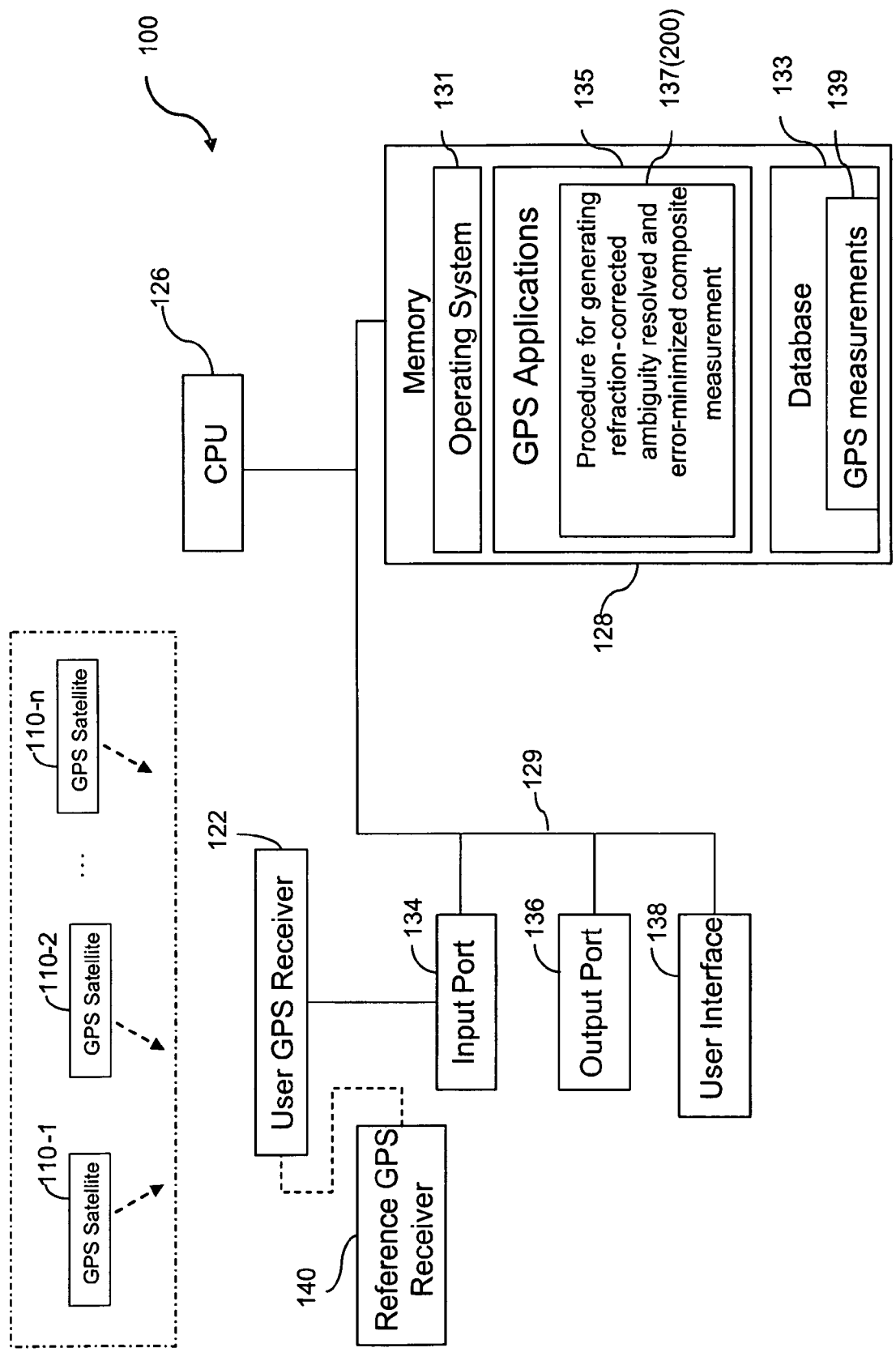
FIG. 1 is a block diagram of a computer system that can be used to carry out the method for generating an ambiguity-resolved, refraction-corrected, and minimum-noise carrier-phase measurement.

FIG. 1 illustrates a computer system 100 that can be used to carry out a method for generating an ambiguity-resolved, refraction-corrected, and minimum-noise composite carrier-phase measurement, according to one embodiment of the present invention. The computer system 100 is coupled to a user GPS receiver 122 which supplies to the computer system 100 GPS code and carrier-phase measurements based on signals from a plurality of satellites 110-1, 110-2, ..., 110-n, where n is the number of satellites in view of the user GPS receiver 122. The user GPS receiver 100 may be in communication with a reference GPS receiver 140 also taking measurements based on signals from the plurality of satellites, which are used to generate corrections to the measurements taken at the user GPS receiver. The plurality of satellites, or any one or more of them, are sometimes referred to hereafter in this document as satellite(s) 110. In some embodiments, the user GPS receiver 122 and the computer system 100 are integrated into a single device, within a single housing, such as a portable, handheld or even wearable position tracking device, or a vehicle-mounted or otherwise mobile positioning and/or navigation system. In other embodiments, the user GPS receiver 122 and the computer system 100 are not integrated into a single device.

As shown in FIG. 1, the computer system 100 includes a central processing unit (CPU) 126, memory 128, an input port 134 and an output port 136, and (optionally) a user interface 138, coupled to each other by one or more communication buses 129. Memory 128 may include high-speed random access memory and may include nonvolatile mass storage, such as one or more magnetic disk storage devices. Memory 128 preferably stores an operating system 131, a database 133, and GPS application procedures 135. The GPS application procedures may include procedures 137 for implementing the method for generating an ambiguity-resolved, refraction-corrected, and minimum-noise composite carrier-phase measurement, according to one embodiment of the present invention, as described in more detail below. The operating system 131 and application programs and procedures 135 and 137 stored in memory 128 are for execution by the CPU 126 of the computer system 124. Memory 128 preferably also stores data structures used during execution of the GPS application procedures 135 and 137, including GPS pseudorange and/or carrier-phase measurements 139, as well as other data structures discussed in this document.

The input port 134 is for receiving data from the GPS receiver 122, and output port 136 is used for exporting data and/or calculation results. Data and calculation results may also be shown on a display device of the user interface 138.

Two principal techniques have been developed to resolve the whole-cycle carrier-phase ambiguities. The first technique is often referred to as the "geometry-free" or "measurement-space" technique and uses smoothed code measurements to determine the whole-cycle ambiguities of the carrier-phase measurements. The second technique is often referred to as the "geometry-dependent" or "position-space" technique and uses a search process to determine which combination of whole-cycle ambiguities with respect to a plurality of satellites in view of the GPS receiver gives the "best" solution according to some criteria, such as a minimum of the sum of the squares of measurement residuals.

There are several advantages of using the geometry-free approach for the carrier-phase ambiguity resolution. A first advantage for the geometry-free approach is that it is less affected by errors in the measurements caused by tropospheric refraction effects because the code and carrier-phase measurements are equally affected by the troposphere. A second advantage for the geometry-free approach is that the ambiguity resolution is done on a satellite by satellite basis, as compared with the geometry-dependent approach, which needs at least five satellites in view of the GPS receiver in order to insure the correctness of the solution. A third advantage for the geometry-free approach is that movement of the user GPS receiver has no effect on the difference of the code and carrier-phase measurements, while the geometry-dependent approach may need to propagate the position of the user GPS receiver forward in time when the user is moving. Also, because the geometry-free approach uses a greater degree-of-freedom than the geometry-dependent approach, it is simpler to verify that a correct resolution of the whole-cycle ambiguities is made in the case of the geometry-free approach. These advantages make the geometry-free approach more favorable for RTK applications.

With the two existing L1 and L2 carrier frequencies, the geometry-free technique is used to resolve the whole-cycle ambiguities in a cascaded manner, in which whole-cycle ambiguities are resolved first for wide-lane measurement combinations having a longest wavelength. A most often used wide-lane combination is a simple difference of the carrier-phase measurements on the existing two frequencies, L1 and L2, which is referred to hereafter as the (L1-L2) measurement difference. The (L1-L2) measurement difference has an approximately 86.2 centimeter wavelength and is well suited for whole-cycle ambiguity resolution. The whole cycle ambiguity in the (L1-L2) measurement difference can be resolved by using a frequency weighted average of the code measurements on the two frequencies, which matches the ionospheric distortion in the carrier-phase measurement difference. The resolved wide-lane whole-cycle ambiguities are then used to step successively to smaller (narrow-lane) wavelengths. This approach, however, only works when the distance between the reference receiver and the user receiver (baseline separation) does not exceed a certain limit, such as 10 to 20 kilometers.

The source of the problem is the diverging effect of the ionosphere upon the two carrier frequencies when the baseline separation becomes large. The (L1-L2) measurement difference is adversely affected by ionospheric refraction effects. The magnitude of the ionospheric refraction effect on the measurement difference is about the average of the effect on the two individual L1 and L2 measurements, but is of opposite sign. Although the whole cycle ambiguity in the (L1-L2) measurement difference can be resolved over large distances, in order to remove the ionospheric refraction effect in the measurement difference, the whole-cycle ambiguity in some other measurement combination with a different dependence on the ionosphere must also be resolved. A measurement combination, or a composite measurement, is a combination of carrier-phase measurements on different carrier frequencies.

With just two carrier frequencies, it is very difficult to resolve the whole-cycle ambiguities on any other combinations of the carrier-phase measurements when the baseline separation is large. Without a third frequency, a best combination that has very little distortion induced by ionospheric refraction is a composite measurement formed using the difference between nine times the L1 carrier-phase measurement and seven times the L2 carrier-phase measurement, which is referred to as the (9L1-7L2) composite measurement. But this composite measurement has two very adverse characteristics. First the effective wavelength of the composite measurement is only 5.35 centimeters. The knowledge of the ambiguity value for the (L1-L2) measurement combination (whether it is even or odd) can be used to increase the effective wavelength from 5.35 to 10.7 centimeters. But it is still impossible to resolve the refraction corrected ambiguity over long baselines because of the adverse multiplication of the multipath noise in the refraction correction process.

As part of the modernization of GPS, a new signal with a third frequency will be made available to civilian users. This new signal is sometimes labeled as the L5 signal for historical reasons and has a frequency of (115*10.23 MHz) or 1176.45 MHz, and a corresponding wavelength of 0.2548 m. The proposed addition of the third frequency to the GPS broadcast signals provides an additional degree of freedom in constructing composite measurements with varying wavelengths, varying sensitivity to the ionosphere, and different noise amplification effects, and thus can be helpful in obtaining ambiguity-resolved and refraction-corrected carrier-phase measurements, which are crucial to high-precision GPS applications.

For subsequent use, a set of equations (1)-(6) are provided below defining the basic relationships between the code and carrier-phase measurements at the three frequencies and the geometric range and the ionospheric refraction error.

Assume that the frequencies of L1, L2 and L5 signals are designated as $f_a$, $f_b$ and $f_c$, respectively. The code measurements $P_a$, $P_b$, and $P_c$ associated with L1, L2 and L5 signals are defined by $$P_a = \rho + I/f_a^2 \quad (1)$$

$$P_b = \rho + I/f_b^2 \quad (2)$$

$$P_c = \rho + I/f_c^2 \quad (3)$$

where $\rho$ is the geometric range (including the tropospheric refraction error) and I is the ionospheric refraction error.

The corresponding scaled carrier-phase measurements $\Phi_a$, $\Phi_b$ and $\Phi_c$ at the three frequencies are defined by $$\Phi_a = (\phi_a + N_a)c/f_a = \rho - I/f_a^2 \quad (4)$$

$$\Phi_b = (\phi_b + N_b)c/f_b = \rho - I/f_b^2 \quad (5)$$

$$\Phi_c = (\phi_c + N_c)c/f_c = \rho - I/f_c^2 \quad (6)$$

where $\phi_a$, $\phi_b$, and $\phi_c$ represent the respective raw carrier-phase measurements at the three frequencies, $N_a$, $N_b$ and $N_c$ represent the unknown primary whole-cycle ambiguities associated with the raw carrier-phase measurements, and c is the speed of light.

Figure 2:
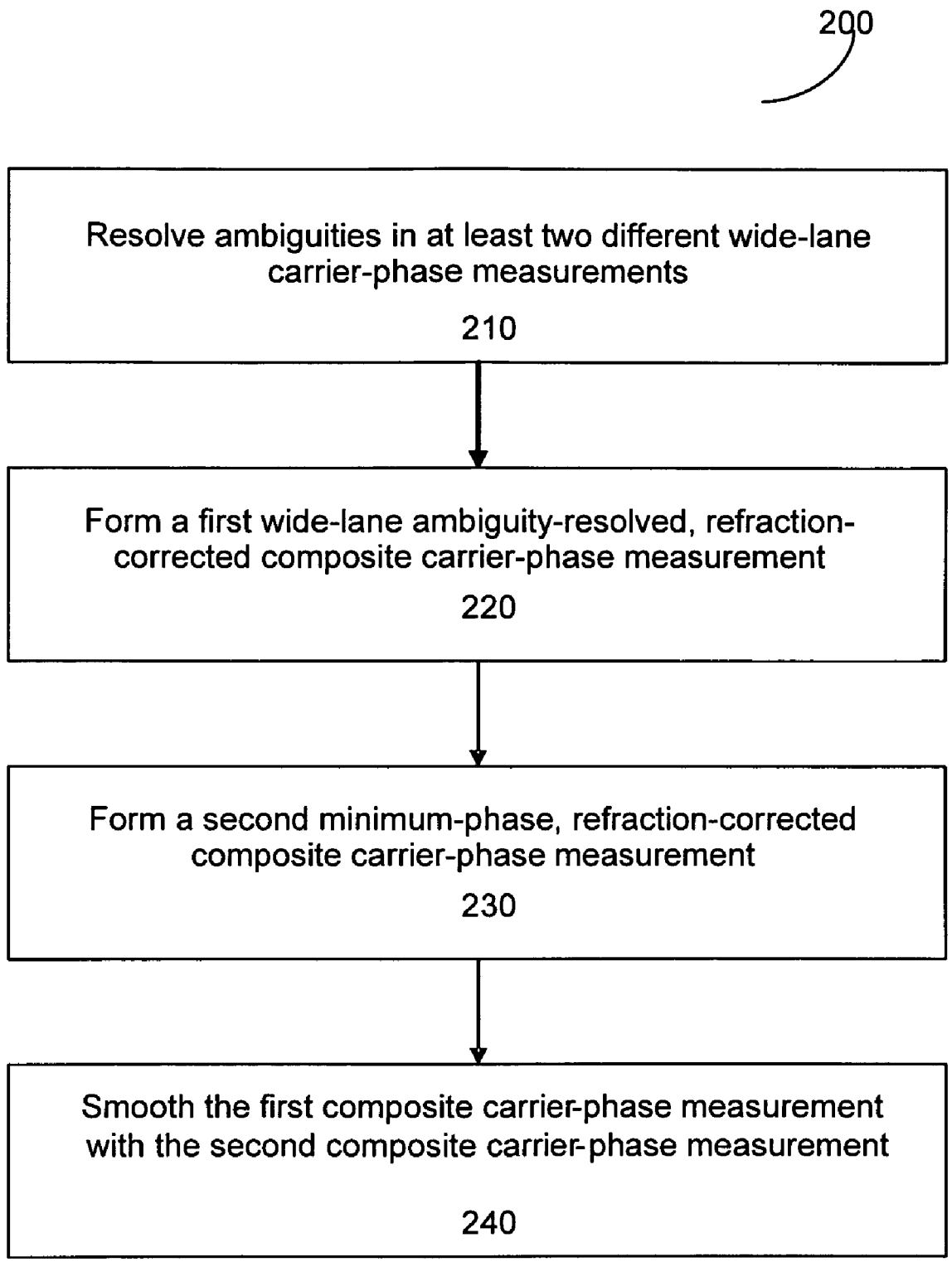
FIG. 2 is a flowchart illustrating a method for generating an ambiguity-resolved, refraction-corrected, and minimum-noise carrier-phase measurement.

FIG. 2 illustrates a method 200 for generating an ambiguity-resolved, refraction-corrected, and minimum-noise composite carrier-phase measurement, according to one embodiment of the present invention. As shown in FIG. 2, method 200 includes operation 210 in which ambiguities are resolved in at least two wide-lane measurements, each formed using the difference between scaled carrier-phase measurements taken at two of the three frequencies.

For example, to resolve the wide-lane ambiguity in the (L1-L2) carrier-phase measurement difference, a frequency-weighted average of equations (1) and (2) is taken that defines a relationship between a composite code measurement and the ionospheric refraction error as $$\bar{P}_{ab} = \frac{f_a P_a + f_b P_b}{f_a + f_b} = \rho + \frac{I}{f_a f_b}. \quad (7)$$

Differencing equation (5) from equation (4) produces a similar relationship between the two carrier-phase measurements and the ionospheric refraction error $$(\phi_a - \phi_b)\lambda_{a-b} + (N_a - N_b)\lambda_{a-b} = \rho + \frac{I}{f_a f_b}. \quad (8)$$

where $\lambda_{a-b}$ is the difference wavelength of the frequency difference $(f_a - f_b)$ between L1 and L2 signals $$\lambda_{a-b} = \frac{c}{f_a - f_b}.$$

Differencing equation (8) from equation (7) and dividing the resultant by the difference wavelength $\lambda_{a-b}$ gives a direct measure of the wide-lane ambiguity as $$N_{a-b} = N_a - N_b = \frac{\bar{P}_{ab}}{\lambda_{a-b}} - (\phi_a - \phi_b) \quad (9)$$

In similar fashion, the wide-lane ambiguities in the (L1-L5) and (L2-L5) carrier-phase measurement differences can be determined by $$N_{a-c} = N_a - N_c = \frac{\bar{P}_{ac}}{\lambda_{a-c}} - (\phi_a - \phi_c) \quad (10)$$

$$N_{b-c} = N_b - N_c = \frac{\bar{P}_{bc}}{\lambda_{b-c}} - (\phi_b - \phi_c) \quad (11)$$

In some embodiments, both the code and the carrier-phase measurements in equations (9)-(11) are assumed to have been corrected using the measurements taken at the reference receiver. But because of the frequency relationships, only two of the three wide-lane carrier-phase measurement differences are independent. Therefore, once the wide-lane ambiguities on any two of these measurement differences are determined, the wide-lane ambiguity in the third measurement difference can be directly determined.

But as long as there is a phase lock between two frequencies in a carrier-phase measurement difference, the corresponding wide-lane ambiguity does not change over time. This value can also be smoothed over time in a similar fashion. In some embodiments, the smoothing process is done with an expanding average filter $$N'_{a-b,n} = \frac{1}{n}(N_{a-b} - N'_{a-b,n-1}) + N'_{a-b,n-1} \quad (12)$$

where n represents the amount of smoothing, e.g., in terms of the number of measurement epochs. The amount of smoothing required to achieve a correct wide-lane ambiguity is a function of the wavelength $\lambda_{a-b}$ of the frequency difference. The smoothed wide-lane ambiguity value can be inserted into equation (8) to produce an ambiguity-resolved, wide-lane carrier phase measurement $$\Phi_{ab} = (\phi_a - \phi_b + N'_{a-b})\lambda_{a-b} = \rho + \frac{I}{f_a f_b}. \quad (13)$$

The last term in equation (13) above corresponds to the ionospheric refraction error in the wide-lane measurement. This error is then removed at operation 220 of method 200 by forming an ambiguity-resolved, refraction-corrected composite carrier-phase measurement using the carrier-phase measurements taken at all the three frequencies, as will be explained below in detail.

The first operation in removing this ionospheric refraction error is to form another ambiguity-resolved, wide-lane carrier phase measurement from the three available primary phase measurements. In some embodiments, the second ambiguity-resolved, wide-lane carrier phase measurement is formed using the (L2-L5) carrier-phase measurement difference since it takes less averaging time to determine an accurate wide-lane ambiguity value. Analogous to equation (13), this second ambiguity-resolved, wide-lane carrier-phase measurement from the (L2-L5) carrier-phase measurements can be defined by $$\Phi_{bc} = (\phi_b - \phi_c + N'_{b-c})\lambda_{b-c} = \rho + \frac{I}{f_b f_c}. \quad (14)$$

A linear combination of equations (13) and (14) eliminates the ionospheric refraction error and results in the ambiguity-resolved, refraction-corrected composite carrier-phase measurement $\Phi_{RC}$.

$$\Phi_{RC} = \frac{f_a}{f_a - f_c}\Phi_{ab} - \frac{f_c}{f_a - f_c}\Phi_{bc} = \rho. \quad (15)$$

Unfortunately, the aforementioned process of forming ambiguity-resolved wide-lane measurements and then removing ionospheric refraction errors substantially amplifies noise in the primary carrier-phase measurements. For example, because the L2 and L5 frequencies are so close to each other (there is only 51.15 MHz difference between the two frequencies), differencing the carrier-phase measurements at the two frequencies in equation (14) results in a large amount of multipath noise in the resultant measurement difference $\Phi_{bc}$. After ionospheric refraction correction in equation (15), the multipath noise would be further boosted.

Moreover, since only two of the three ambiguity-resolved, wide-lane carrier-phase measurements are independent, the noise amplification effect is independent of which two are chosen in equation (15) to form the ambiguity-resolved, refraction-corrected composite carrier-phase measurement. In other words, similar problems are present in other combinations of the wide-lane carrier-phase measurements. In fact, this observation is more evident by replacing the two wide-lane measurements $\Phi_{ab}$ and $\Phi_{bc}$ in equation (15) with the scaled carrier-phase measurements $\Phi_a$, $\Phi_b$ and $\Phi_c$ defined in equations (4)-(6)

$$\Phi_{RC} = C_1 \Phi_a + C_2 \Phi_b + C_3 \Phi_c \quad (16)$$

$$= \frac{f_a^2}{(f_a - f_b)(f_a - f_c)}\Phi_a +$$

$$\frac{f_b^2}{(f_b - f_a)(f_b - f_c)}\Phi_b +$$

$$\frac{f_c^2}{(f_c - f_a)(f_c - f_b)}\Phi_c$$

$$= \rho.$$

Equation (16) defines a generic relationship between a composite carrier-phase measurement and the primary carrier-phase measurements at the three frequencies. This relationship applies to the United States' GPS system as well as other Global Navigation Satellite Systems (GNSS) such as the European Galileo System. Actually, the GPS system and the Galileo system share the same frequencies for the L1 and L5 signals, but different frequencies for the L2 signal. The middle frequency of the Galileo system, E6, is 1278.75 MHz, which is 51.15 MHz higher than the L2 frequency.

Equation (16) indicates that the frequencies of the carrier signals affect the noise level in the composite carrier-phase measurement $\Phi_{RC}$. In some embodiments, the expected noise in the carrier-phase measurement $\Phi_{RC}$ is defined as the square root of the sum of the squares of the noises in the primary carrier-phase measurements, each noise weighted by its associated coefficients in equation (16). Table 1 provides the coefficient values in equation (16) under different middle frequency (GPS L2, Galileo E6, and 1.3299 GHz) as well as the corresponding noise levels assuming that there is equal noise of one centimeter in each of the three carrier signals.

TABLE 1

| | Amplification of one centimeter noise | | | |
|---|---|---|---|---|
| Mid. Freq. | $C_1$ | $C_2$ | $C_3$ | RSS |
| GPS L2 | 17.89 | −84.71 | 67.82 | 109.98 |
| Galileo E6 | 20.97 | −53.88 | 33.91 | 67.03 |
| 1.3299 GHz | 25.34 | −46.94 | 22.61 | 57.94 |

Apparently, a change from the GPS L2 signal to the Galileo E6 signal as the middle frequency reduces noise by approximately 39% ≈(109.98−67.03)/109.98. This suggests that the Galileo E6 signal is better than the GPS L2 signal in minimizing the noise of the refraction-corrected, ambiguity-resolved, wide-lane carrier phase measurements.

Although the noise gets amplified in the refraction-corrected, ambiguity-resolved, wide-lane composite carrier-phase measurement $\Phi_{RC}$, it compares favorably with the noise level in a refraction-corrected composite code measurement. This is, at least in part, because that the carrier-phase measurements are less subject to those biases resulting from various sources such as receiver design characteristics than the code measurements. Further, the composite carrier-phase measurement is less sensitive to phase windup because of an equal amount of positive and negative phase measurements in the composite measurement. Most of the noise in the composite carrier-phase measurement $\Phi_{RC}$ results from the multipath present in the individual primary carrier-phase measurements. Fortunately, the same method employed to smooth out the multipath in the code measurements can be used to smooth out the multipath noise in the composite carrier-phase measurement.

To reduce the multipath noise, method 200 includes operation 230 in which a minimum-noise, refraction-corrected composite carrier-phase measurement is formed and operation 240 in which the ambiguity-resolved, refraction-corrected carrier-phase measurement of equation (16) is smoothed with the minimum-noise, refraction-corrected composite carrier-phase measurement. Note that there is no requirement for resolving the ambiguity in the minimum-noise, refraction-corrected composite carrier-phase measurement formed at operation 230. In other words, the composite carrier-phase measurement may include an ambiguity-related error.

Similar to equation (16), the minimum-noise, refraction-corrected composite carrier-phase measurement $\Phi_M$ is defined as a function of the three scaled primary carrier-phase measurements $\Phi_a$, $\Phi_b$, and $\Phi_c$ $$\Phi_M = a\Phi_a + b\Phi_b + c\Phi_c \quad (17)$$

where a, b, and c are coefficients for multiplying the scaled primary carrier-phase measurements at the three frequencies. Substituting the definitions of the three scaled primary carrier-phase measurements in equations (4)-(6) into equation (17) converts equation (17) into a new form $$\Phi_M = (a+b+c)\rho - \left(\frac{a}{f_a^2} + \frac{b}{f_b^2} + \frac{c}{f_c^2}\right)I. \quad (18)$$

For illustrative purposes, assume that each of the three scaled primary carrier-phase measurements has noise of one centimeter. For the composite measurement $\Phi_M$ to reach a minimum, the coefficients a, b and c must satisfy the following three constraints:

$$a+b+c=1 \quad (19)$$

$$a/f_a^2 + b/f_b^2 + c/f_c^2 = 0 \quad (20)$$

$$a^2+b^2+c^2=\min \quad (21)$$

Equation (19) ensures that the range measurement is not scaled up or down by the choice of coefficients. Equation (20) ensures that the ionospheric refraction error is eliminated from the composite measurement. Equation (21) ensures that there is minimum noise amplification with the choice of coefficients. Note that if the equal-noise assumption is invalid, i.e., non-equal noise is present in the three carrier-phase measurements, equation (21) needs to be modified accordingly.

Solving equation (19) for c gives:

$$c=1-a-b. \quad (22)$$

Plugging equation (22) into equation (20) and solving for b gives:

$$b = \frac{f_a^2}{f_a^2 - f_c^2} - a\frac{f_a^2(f_b^2 - f_c^2)}{f_b^2(f_a^2 - f_c^2)}, \quad (23)$$

which expression can be further simplified to:

$$b = F_a - aF_b. \quad (24)$$

Replacing c and b in equation (21) with equations (22) and (24) respectively gives:

$$\min = (1-2F_a+2F_a^2)-2a(1-F_a-F_b+2F_aF_b)+2a^2(1-F_b+F_b^2) \quad (25)$$

Taking the derivative with respect to a, setting the derivative to zero, and then solving for a gives:

$$a = \frac{(1-F_a-F_b+2F_aF_b)}{2(1-F_b+F_b^2)}. \quad (26)$$

The values of b and c can be obtained by substituting equation (26) back into equations (24) and (22), respectively. The numerical values of the coefficients a, b, and c obtained above under the three different middle frequencies are shown in Table 2.

TABLE 2

Coefficients for refraction-correction with minimum noise

| Mid. Freq. | a | b | c | RSS = $\sqrt{a^2+b^2+c^2}$ |
|---|---|---|---|---|
| GPS L2 | 2.3269 | −0.3596 | −0.9673 | 2.546 |
| Galileo E6 | 2.2691 | −0.0245 | −1.2446 | 2.588 |
| 1.3299 GHz | 2.1065 | 0.3135 | 1.4200 | 2.560 |

The final column of Table 2 estimates the amplification of noise in the primary carrier-phase measurements. Unlike the result in Table 1, the GPS L2 frequency actually results in a slightly lower refraction-corrected noise (2.546) than the Galileo E6 frequency (2.588) if there is no primary ambiguity in the composite carrier-phase measurement $\Phi_M$.

Figure 3:
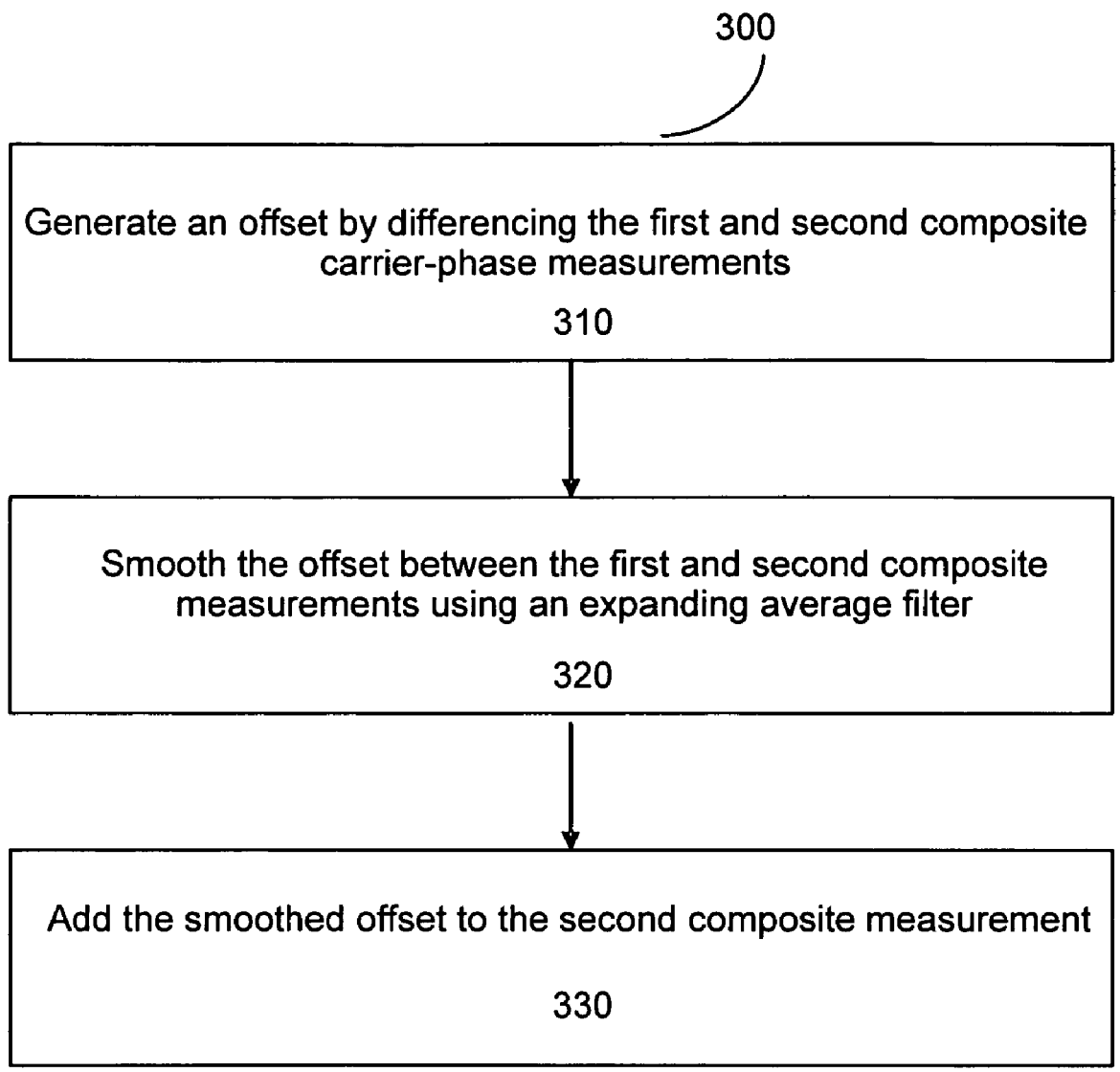
FIG. 3 is a flowchart illustrating a smoothing process used in the method for generating an ambiguity-resolved, refraction-corrected, and minimum-noise carrier-phase measurement.

FIG. 3 illustrates a smoothing process 300 in operation 240 according to some embodiments of the present invention. As noted above, both the composite carrier-phase measurement $\Phi_{RC}$ in equation (16) and the composite measurement $\Phi_M$ in equation (17) contain a measurement of the refraction-corrected geometric range. Thus, differencing the two composite measurements yields an offset value O (operation 310) as a function of the multipath noise in the three frequencies and a constant bias error caused by primary ambiguities in equation (17)

$$O = \Phi_{RC} - \Phi_M. \quad (27)$$

After smoothed by an expanding average filter (operation 320), the offset value will approach the negative value of the constant bias error in equation (17). In some embodiments, the smoothed offset is given by:

$$S_n = \frac{1}{n}(O - S_{n-1}) + S_{n-1} \quad (28)$$

where the value of n increases by one at each measurement epoch.

Finally, this smoothed bias value $S_n$ is added back onto the minimum-noise, refraction-corrected composite carrier-phase measurement $\Phi_M$ (operation 330) to produce an increasingly accurate minimum-noise, refraction-corrected composite carrier-phase measurement with no bias. In some embodiments, a smoothed ambiguity-resolved, refraction-corrected measurement $\Phi_S$ is defined by $$\Phi_S = \Phi_M + S_n. \quad (29)$$

One advantage of using operations 320 and 330 in process 300 for smoothing the ambiguity-resolved carrier-phase measurement is that the offset value can be monitored for reasonableness during the smoothing process.

Note that the noise in the primary carrier-phase measurements is not white. Rather, it is dominated by multipath effects, which are colored noise. Thus, the actual noise averaging trend of equation (29) depends upon the autocorrelation of the multipath and receiver measurement noise. In some embodiments, the initial positive autocorrelation causes the actual noise averaging to be slower than white noise. After several minutes, when the autocorrelation goes negative, the actual noise then averages out faster than white noise.

It should also be noted that, unlike the multipath effects in the code measurements, the multipath in the carrier-phase measurements has an equal distribution of positive and negative error and should converge to zero over time. As a result, one should expect the residual noise to be a few centimeters after 15-30 minutes of smoothing.

Since any one of the three wide-lane ambiguity-resolved composite carrier-phase measurements can be inferred from the other two measurements, there is only one degree of freedom for the whole-cycle ambiguities present in the three primary carrier-phase measurements. In other words, constrained by the correct wide-lane ambiguity values, any estimation error in one of the primary whole-cycle ambiguity values will cause an equal error in each of the other primary whole-cycle ambiguity values. For example, if the whole-cycle ambiguity $N_a$ in equation (4) happens to be one whole cycle larger than its true value, the whole-cycle ambiguities $N_b$ and $N_c$ will each be one whole cycle larger than their true values assuming that the wide-lane ambiguities ($N_a$-$N_b$) and ($N_a$-$N_c$) in equations (9) and (10) have been determined correctly.

Table 3 below gives an estimated refraction-corrected wavelength $\lambda_{RC}$ of the composite measurement $\Phi_M$ under respective middle frequencies. This wavelength $\lambda_{RC}$ is essentially the range estimate error caused by the one whole-cycle ambiguity error in each of the three primary carrier-phase measurements. As shown below in Table 3, the range estimate error is approximately 11 centimeters (all wavelengths are shown in units of meters).

TABLE 3

Refraction-corrected wavelength

| Mid. freq. | $a\lambda_a$ | $b\lambda_b$ | $c\lambda_c$ | $\lambda_{RC} = a\lambda_a + b\lambda_b + c\lambda_c$ |
|---|---|---|---|---|
| GPS L2 | 0.4428 | −.0878 | −.2465 | 0.1085 |
| Galileo E6 | 0.4318 | −.0058 | −.3172 | 0.1089 |
| 1.3299 GHz | 0.4008 | 0.0707 | −.3619 | 0.1097 |

As noted earlier, the minimum-noise, refraction-corrected composite carrier-phase measurement $\Phi_M$ may include a constant ambiguity-related error. But the refraction-corrected, wide-lane ambiguity-resolved composite carrier-phase measurement $\Phi_{RC}$ is independent of any ambiguity-related errors in the primary carrier-phase measurements. Accordingly, the difference between the two composite carrier-phase measurements as represented by equations (27) through (29), when divided by the refraction-corrected wavelength $\lambda_{RC}$ (the last column of Table 3) and rounded to the nearest integer, estimates the value of the whole-cycle ambiguity error $\Delta N$ in the primary carrier-phase measurements, i.e., $$\Delta N = [S_n / \lambda_{RC}]_{rnd}. \quad (30)$$

The addition of the whole-cycle ambiguity error $\Delta N$ to the initial estimate of the three primary whole-cycle ambiguities $N_a$, $N_b$, and $N_c$ results in more accurate values of the three primary whole-cycle ambiguities, $$N_a' = N_a + \Delta N \quad (31)$$

$$N_b' = N_b + \Delta N \quad (32)$$

$$N_c' = N_c + \Delta N. \quad (33)$$

By substituting these accurate ambiguity values back into equation (17), a minimum-noise, refraction-corrected, and ambiguity-resolved composite carrier-phase measurement $\Phi_{AR}$ can be expressed as $$\Phi_{AR} = a\Phi_a + b\Phi_b + c\Phi_c + (a\lambda_a + b\lambda_b + c\lambda_c)\Delta N \quad (34)$$

$$= \Phi_M + \lambda_{RC} \cdot \Delta N.$$

The composite measurement $\Phi_{AR}$ in equation (34) is similar to the composite measurement $\Phi_S$ in equation (29). But since the primary ambiguity error is a multiple of one whole cycle, the rounding to the nearest integer in equation (30) makes the composite measurement $\Phi_{AR}$ more accurate than the composite measurement $\Phi_S$.

As shown in equations (4)-(6), the three scaled primary measurements $\Phi_a$, $\Phi_b$, and $\Phi_c$ are functions of the geometric range $\rho$, the ionospheric refraction effect I, and noise. In one embodiment, the three primary measurements can be combined into one expression (e.g., equation (16)) to eliminate the ionospheric refraction effect I while leaving only the geometric range $\rho$ and the noise. In another embodiment, the three primary measurements can be combined into another expression to eliminate the geometric range $\rho$ while leaving the ionospheric refraction effect and the noise. Inserting these two expressions into equations (4)-(6) cancels out both the geometric range and the ionospheric refraction effect, resulting in a scaled combination of the noise in the three primary measurements.

There are other ways of generating the scaled noise combination. In some embodiments, the scaled noise combination is achieved by generating two representations for the ionospheric refraction effect I using different combinations of the primary measurements and then differencing the two representations. In some other embodiments, the scaled noise combination is achieved by generating two representations for the range $\rho$ using different combinations of the primary measurements and then differencing the two representations. In yet some other embodiments, the scaled noise combination is achieved in one operation by generating a combination of the primary measurements that eliminates both the range and the ionospheric refraction effect.

The scaled noise combination is subject to errors in the primary ambiguity values. The offset value defined in equation (27) is actually one particular expression of the scaled noise combination. Equation (35) is another expression of the scaled noise combination.

$$O_s = f_a f_b f_c \left[ \left( \frac{\Phi_a - \Phi_b}{f_c^2} \right) + \left( \frac{\Phi_c - \Phi_a}{f_b^2} \right) + \left( \frac{\Phi_b - \Phi_c}{f_a^2} \right) \right] \quad (35)$$

Clearly, the range component p is canceled in each pair of the primary measurements. The ionospheric refraction effect component I is canceled between the three measurement difference terms. As a result, the residual offset value $O_S$ is entirely due to the noise plus any whole-cycle ambiguity errors in the primary measurements.

Simplifying equation (35) gives $$O_S = C_a \Phi_a + C_b \Phi_b + C_c \Phi_c \quad (36)$$

$$= \frac{f_a(f_b^2 - f_c^2)}{f_b f_c} \Phi_c + \frac{f_b(f_c^2 - f_a^2)}{f_a f_c} \Phi_b + \frac{f_c(f_c^2 - f_b^2)}{f_a f_b} \Phi_c.$$

Table 4 gives the coefficients of equation (36) under different middle frequencies. For subsequent use, the last column of Table 4 includes the range bias, in meters, caused by a positive one whole-cycle error in the three primary ambiguities.

TABLE 4

| | Coefficients of Equation (36) | | | |
|---|---|---|---|---|
| Mid. Freq. | $C_a$ | $C_b$ | $C_c$ | $\lambda_{amb} = C_a\lambda_a + C_b\lambda_b + C_c\lambda_c$ |
| GPS L2 | 13.112 | −71.085 | 57.973 | −.09142 |
| Galileo E6 | 25.711 | −74.047 | 48.336 | −.14972 |
| 1.3299 GHz | 37.856 | −77.009 | 39.153 | −.17871 |

In some embodiments, the offset value $O_S$ in equation (36) is smoothed in an expanding averaging process similar to that of equation (28). After sufficient smoothing, the offset value $O_S$ approaches a multiple of the $\lambda_{amb}$ value in Table 4. Dividing the offset value $O_S$ by the $\lambda_{amb}$ value and rounding the result to the nearest integer gives the error by which the primary whole-cycle ambiguities need to be corrected.

In some other embodiments, the smoothing of the offset value $O_S$ in equation (36) can be commenced with the acquisition of the first set of primary code and carrier-phase measurements. For subsequent use, equation (36) is first rewritten by incorporating the three wavelengths in equations (4)-(6) into their associated coefficients.

$$O_s = K_a(\phi_a + N_a) + K_b(\phi_b + N_b) + K_c(\phi_c + N_c) \quad (37)$$

where the coefficients $K_a$, $K_b$, and $K_c$ are, respectively, defined as $$K_a = \frac{c(f_b^2 - f_c^2)}{f_b f_c}$$

$$K_b = \frac{c(f_c^2 - f_a^2)}{f_a f_c}$$

$$K_c = \frac{c(f_a^2 - f_b^2)}{f_a f_b}.$$

As noted above, only two of the wide-lane ambiguities are independent. This means that given any one of the primary ambiguity values at one of the three frequencies, the other two can be determined. Therefore, incorporating the definitions for the wide-lane ambiguities in equations (9) and (11) into equation (37) converts equation (37) into $$O_s = T_{a-b}(\phi_a - \phi_b + N_{a-b}) + T_{b-a}(\phi_b - \phi_c + N_{b-c}) + T_a(\phi_a + N_a) \quad (38)$$

where $T_{a-b} = -K_b - K_c$ $T_{b-a} 32 - K_c$ $T_a = K_a + K_b + K_c.$

Table 5 lists the numerical values of coefficients in equation (38) under different middle frequencies.

TABLE 5

| | Coefficients of equation (38) | | |
|---|---|---|---|
| Mid. Freq. | $T_{a-b}$ | $T_{b-a}$ | $T_a$ |
| GPS L2 | 3.06915 | −17.52906 | −0.10848 |
| Galileo E6 | 3.66737 | −8.95844 | −0.10889 |
| 1.3299 GHz | 4.53041 | −6.12272 | −0.10967 |

Figure 4:
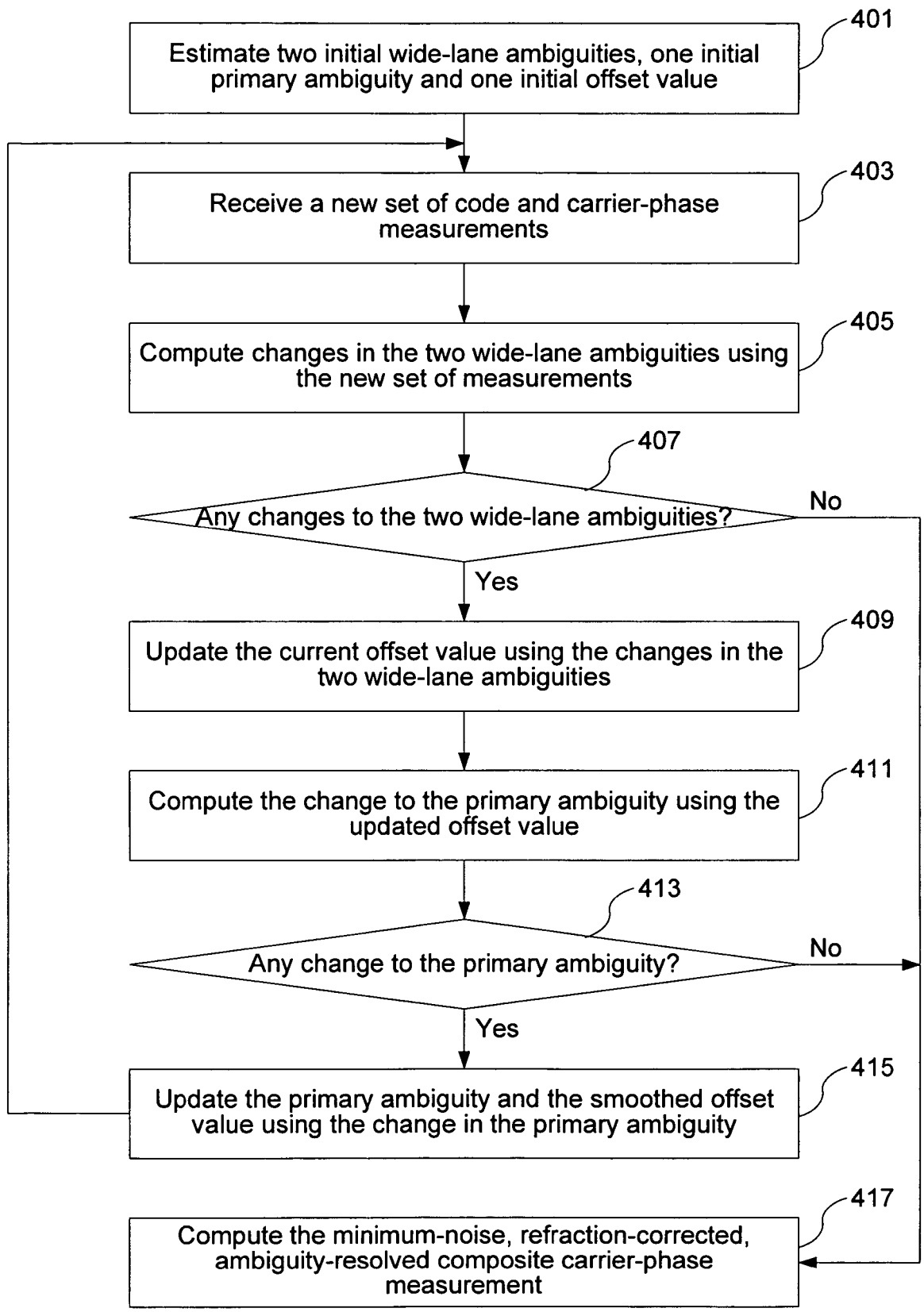
FIG. 4 is a flowchart illustrating an alternate smoothing process used in the method for generating an ambiguity-resolved, refraction-corrected, and minimum-noise carrier-phase measurement.

FIG. 4 is a flowchart illustrating such an alternate smoothing process used in the method for generating an ambiguity-resolved, refraction-corrected, and minimum-noise carrier-phase measurement. The smoothing process begins with estimating initial values of the two wide-lane ambiguities $N_{a-b}$ and $N_{b-c}$, the primary ambiguity $N_a$ and the offset value $O_1$ (operation 401).

In particular, the two wide-lane ambiguity values $N_{a-b}$ and $N_{b-c}$, are first derived from equations (9) and (11). These two values are then rounded to the nearest integers $\hat{N}_{a-b}$ and $\hat{N}_{b-c}$, respectively. Assuming that the offset value in equation (38) is zero, an initial estimate of the primary ambiguity $N_a$ is defined by $$N_a = [3.06915(\phi_a - \phi_b + \hat{N}_{a-b}) - 17.52906(\phi_b - \phi_c + \hat{N}_{b-c})]/0.10848 - \phi_a. \quad (39)$$

Round the value of $N_a$ to its nearest integer value $$\hat{N}_a = [N_a]_{rnd}. \quad (40)$$

The initial offset value $O_1$ is then given by the scaled residual of the quantization process:

$$O_1 = 0.10848(N_a - \hat{N}_a). \quad (41)$$

Starting from operation 403, the smoothing process enters an iterative loop of processing subsequent measurements. During this process, the ambiguity values and the offset value are refined iteratively until a predefined termination condition is met.

Upon receipt of a new set of measurements (403), the smoothing process generates a new pair of wide-lane ambiguity values $\hat{N}_{a-b}$, $\hat{N}_{b-c}$ and then computes their changes from the prior values (405). If there is no change (407, no), the smoothing process then computes the minimum-noise, refraction-corrected, ambiguity-resolved composite carrier-phase measurement (417).

For convenience, equation (17) is first rewritten as $$\Phi_M = V_{a-b}(\phi_a - \phi_b + \hat{N}_{a-b}) + V_{b-c}(\phi_b - \phi_c + \hat{N}_{b-c}) + V_a(\phi_a + \hat{N}_a) \quad (42)$$

where $V_a = a\lambda_a + b\lambda_b + c\lambda_c$ $V_{a-b} = -b\lambda_b - c\lambda_c$ $V_{b-c} = -c\lambda_c.$ Therefore, $\Phi_M$ is determined by plugging the primary measurements and the current set of wide-lane and primary ambiguity values $\hat{N}_{a-b}$, $\hat{N}_{b-c}$ and $\hat{N}_a$ into equation (42). In some other embodiments, the smoothing process does not compute $\Phi_M$ immediately after detecting there is no change to the two wide-lane ambiguities. Rather, it returns to loop through operations 403, 405, and 407 using subsequent measurements. Only after a predetermined number of iterations, each iteration indicating that there is no change at operation 407, will the smooth process move to operation 417. These additional iterations can reduce the effect of noise in the measurements and improve the accuracy of the resultant composite measurement.

If there is any change in the wide-lane ambiguity (407, yes), the smoothing process updates the current offset value using the changes in the two wide-lane ambiguities (409). In some embodiments, this update requires that the prior offset value be adjusted before the new offset value is computed and then averaged with the prior one.

Assuming that the current iteration is the $n^{th}$ measurement, the changes in the wide-lane ambiguities are defined as $$\Delta\hat{N}_{a-b} = \hat{N}_{a-b,n} - \hat{N}_{a-b,n-1} \quad (43)$$

$$\Delta\hat{N}_{b-c} = \hat{N}_{b-c,n} - \hat{N}_{b-c,n-1}. \quad (44)$$

The $(n-1)^{th}$ offset value is retroactively adjusted by changes in the wide-lane ambiguities.

$$O_{n-1}=O_{n-1}+3.06815\Delta\hat{N}_{a-b}-17.52906\Delta\hat{N}_{b-c} \quad (45)$$

A new offset value is then computed directly from equation (38) using the most recent values obtained for each ambiguity (using the GPS coefficients).

$$O=3.06815(\phi_a-\phi_b+\hat{N}_{a-b})-17.52906(\phi_b-\phi_c+\hat{N}_{b-c})-0.10848(\phi_a+\hat{N}_a) \quad (46)$$

This new offset value is used in equation (28) to update the smoothed offset value $S_n$. The smoothed offset value $S_n$ is then used to compute a change to the primary ambiguity value $N_a$ (411)

$$\Delta N_a = S_n/0.10848, \quad (47)$$

which is rounded to $$\Delta\hat{N}_a = [\Delta N_a]_{rnd}. \quad (48)$$

If this rounded value is zero, i.e., there is no change to the primary ambiguity value (413, no), the smoothing process then computes the final composite carrier-phase measurement using equation (42). In other words, the wide-lane ambiguities and primary ambiguity are resolved when they do not change between two measurement epochs after being rounded to nearest integers. If not (413, yes), the primary ambiguity value must be corrected and the current smoothed offset value adjusted (415).

$$\hat{N}_a = \hat{N}_a + \Delta\hat{N}_a \quad (49)$$

$$S_n = S_n - 0.10848\Delta\hat{N}_a \quad (50)$$

The smoothing process then returns to operation 403 and repeats the process for the next set of measurements. This completes the alternate process of computing a smoothed offset value, which is smoothed as the measurements are acquired, using the smoothed results to compute the best estimate of the ambiguities, and using the ambiguities to compute a minimum-noise refraction-corrected range measurement.

It should be noted that, although the example above uses the coefficients for the GPS frequencies, the same process works equally for the Galileo system having a different set of coefficients as defined in Table 5.

Thus, the present invention provides a method for computing a minimum-noise, refraction-corrected, and ambiguity-resolved carrier-phase composite measurement. The present invention provides different approaches for resolving the primary ambiguity errors in the composite measurement. It is believed that a very accurate minimum-noise, refraction-corrected and ambiguity-resolved measurement process can enhance a number of GPS applications. For example, it may reduce or eliminate the distance constraints in the carrier-phase differential GPS, which is often referred to as Real-Time Kinematic (RTK) GPS.

For simplicity, the equations above are written in a form as if there is no differencing of measurements across sites. Although the present invention can be used on single-site measurements theoretically, there can be significant code versus carrier biases in the transmission from the individual satellites which would prevent the process from working on a site by site basis. But, given measurements at known sites around the world, it is possible to measure any code or carrier biases and characterize them as a function of the angle to the receiver site relative to the satellite fixed coordinates. Such a calibration process would allow single site processing. Without calibration, the equations can be applied directly to the measurements either differenced across sites or the measurements of a given site after adjustment with corrections generated at a reference site.

Similarly, the equations are written as if there is no differencing of measurements across satellites. The receiver front-end filters may create, in effect, a different clock reference at the different received frequencies. This may create a bias between the wide-lane carrier-phase measurements (the difference of the reference clocks at the two frequencies) and the matching frequency-weighted code measurements (a weighted average of the clocks at the two frequencies). If this bias is large, it may lead to incorrect ambiguity resolution. But this problem can be avoided by subtracting the measurements from a given satellite or from an average across all satellites.

Finally, since the troposphere affects the measurements by the same amount at each frequency, the ambiguity resolution, and refraction correction processes are transparent to tropospheric effects. Specifically, the ambiguity resolution process and the formation of the refraction-corrected composite measurements leave the tropospheric component of the measurements unchanged. This is one advantage of the "geometry-free" approach, i.e., the tropospheric induced range errors do not adversely affect the ambiguity resolution process.

Although the present invention has been described with respect to a few specific embodiments, it should be understood that various changes, substitutions, and alterations can be made hereto without departing from the spirit and scope of the invention as defined by the appended claims.

I claim:

1. A method for generating an ambiguity-resolved, refraction-corrected, and minimum-noise carrier-phase measurement, comprising:
    forming a first composite carrier-phase measurement using primary carrier-phase measurements on three carrier frequencies, wherein the first composite carrier-phase measurement is a wide-lane ambiguity-resolved, refraction-corrected composite carrier-phase measurement;
    forming a second composite carrier-phase measurement using the primary carrier-phase measurements on the three carrier frequencies, wherein the second composite carrier-phase measurement is a minimum-noise, refraction-corrected composite carrier-phase measurement, and wherein the second composite carrier-phase measurement includes an unresolved whole-cycle ambiguity; and
    smoothing the first composite carrier-phase measurement with the second composite carrier-phase measurement;
    wherein the unresolved whole-cycle ambiguity is resolved by:
        estimating a refraction-corrected wavelength for the second composite carrier-phase measurement;
        determining a smoothed offset value between the first and second composite carrier-phase measurements;
        dividing the smoothed offset value by the refraction-corrected wavelength; and
        rounding the dividing result to a nearest integer to produce a resolved value of the whole-cycle ambiguity of the second composite carrier-phase measurement.

2. The method of claim 1, wherein the first composite carrier-phase measurement is a linear combination of only the primary carrier-phase measurements on the three carrier frequencies.

3. The method of claim 1, wherein the first composite carrier-phase measurement is a linear combination of two distinct ambiguity-resolved, wide-lane carrier-phase measurements, each wide-lane carrier-phase measurement being formed by differencing two of the three primary carrier-phase measurements.

4. The method of claim 3, wherein each wide-lane carrier-phase measurement has a whole-cycle ambiguity based on a frequency-weighted average of corresponding code measurements and a difference in raw measurement between the two respective primary carrier-phase measurements.

5. The method of claim 1, wherein the second composite carrier-phase measurement is a linear combination of the three primary carrier-phase measurements, each weighted by a respective coefficient, and the three coefficients satisfy one or more predefined conditions so as to minimize noise in the second composite carrier-phase measurement.

6. The method of claim 5, wherein the predefined conditions include that the sum of the three coefficients equals to a constant.

7. The method of claim 5, wherein the predefined conditions include that the sum of the three coefficients, each divided by a square of an associated carrier frequency, equal to zero.

8. The method of claim 5, wherein the predefined conditions include that the three coefficients have values such that the sum of the square of each of the three values is minimized assuming equal phase-noise in each of the three primary carrier-phase measurements.

9. The method of claim 1, wherein the ambiguity-resolved, refraction-corrected, and minimum-noise composite measurement is achieved by summing the second composite carrier-phase measurement and a result of multiplying the refraction-corrected wavelength and the resolved value of the whole-cycle ambiguity of the second composite carrier-phase measurement.

10. The method of claim 1, wherein the smoothing operation further comprises:
generating an offset by differencing the first and second composite carrier-phase measurements at each of a plurality of measurement epochs;
smoothing the offset using an expanding average filter over the plurality of measurement epochs; and
adding the smoothed offset to the second composite carrier-phase measurement to obtain the ambiguity-resolved, refraction-corrected, and minimum-noise carrier-phase measurement.

11. A method for obtaining an ambiguity-resolved, refraction-corrected, and minimum-noise composite carrier-phase measurement, comprising:
obtaining primary carrier-phase measurements on three carrier frequencies at a particular measurement epoch;
forming a composite carrier-phase measurement from a linear combination of the primary carrier-phase measurements on the three carrier frequencies, the composite carrier-phase measurement including two wide-lane ambiguities and one primary ambiguity;
updating the two wide-lane ambiguities and the one primary ambiguity using the primary carrier-phase measurements;
repeating said obtaining, forming and updating operations for a plurality of measurement epochs until the wide-lane ambiguities and primary ambiguity are resolved; and
computing the ambiguity-resolved, refraction-corrected, and minimum-noise composite carrier-phase measurement using the resolved wide-lane ambiguities and primary ambiguity.

12. The method of claim 11, wherein the wide-lane ambiguities and primary ambiguity are resolved when they do not change between two measurement epochs after being rounded to nearest integers.

13. A positioning or navigation system, comprising:
a receiver configured to obtain code and carrier-phase measurements based on signals from a plurality of satellites in view of the receiver, the signals being transmitted in three different carrier frequencies;
a computer coupled to the receiver, the computer including a processor and a memory coupled to the processor, the memory storing therein program instructions which, when executed by the processor, generate an ambiguity-resolved, refraction-corrected, and minimum-noise composite carrier-phase measurement, the program instructions comprising:
instructions for forming a first composite carrier-phase measurement using primary carrier-phase measurements on three carrier frequencies, wherein the first composite carrier-phase measurement is a wide-lane ambiguity-resolved, refraction-corrected composite carrier-phase measurement;
instructions for forming a second composite carrier-phase measurement using the primary carrier-phase measurements on the three carrier frequencies, wherein the second composite carrier-phase measurement is a minimum-noise, refraction-corrected composite carrier-phase measurement; and
instructions for smoothing the first composite carrier-phase measurement with the second composite carrier-phase measurement;
wherein the instructions for forming the second composite carrier-phase measurement includes instructions for solving a whole-cycle ambiguity of the second composite carrier-phase measurement; and
wherein the instructions for solving the whole-cycle ambiguity include:
instructions for estimating a refraction-corrected wavelength for the second composite carrier-phase measurement;
instructions for determining a smoothed offset value between the first and second composite carrier-phase measurements;
instructions for dividing the smoothed offset value by the refraction-corrected wavelength; and
instructions for rounding the dividing result to a nearest integer to produce a resolved value of the whole-cycle ambiguity of the second composite carrier-phase measurement.

14. The positioning system of claim 13, wherein the ambiguity-resolved, refraction-corrected, and minimum-phase composite measurement is achieved by summing the second composite carrier-phase measurement and a result of multiplying the refraction-corrected wavelength and the resolved value of the whole-cycle ambiguity of the second composite carrier-phase measurement.

15. The positioning system of claim 13, wherein the second composite carrier-phase measurement is a linear combination of the three primary carrier-phase measurements, each weighted by a respective coefficient, and the three coefficients satisfy one or more predefined conditions so as to minimize noise in the second composite carrier-phase measurement.

16. The positioning system of claim 13, wherein the smoothing instructions further include:

instructions for generating an offset by differencing the first and second composite carrier-phase measurements at each of a plurality of measurement epochs;

instructions for smoothing the offset using an expanding average filter over the plurality of measurement epochs; and instructions for adding the smoothed offset to the second composite carrier-phase measurement to obtain the ambiguity-resolved, refraction-corrected, and minimum-noise carrier-phase measurement.

17. The method of claim 11, wherein updating the two wide-lane ambiguities and the one primary ambiguity using the primary carrier-phase measurements includes:

receiving a new set of code measurements and carrier-phase measurements;

computing changes in the two wide-lane ambiguities using the new set of code measurements and carrier-phase measurements;

determining whether values of the two wide-lane ambiguities have changed from prior values of the two wide-lane ambiguities; and in response to determining that the values of the two wide-lane ambiguities have changed from the prior values of the two wide-lane ambiguities, updating an offset value using the changes in the two wide-lane ambiguities; and computing a change to the one primary ambiguity using the updated offset value.

18. The method of claim 17, wherein after computing the change to the one primary ambiguity using the updated offset value, the method further comprises:

rounding the change to the one primary ambiguity to the nearest integer to produce a rounded version of the change to the one primary ambiguity;

determining whether the rounded version of the change to the one primary ambiguity is equal to zero; and in response to determining that the rounded version of the change to the one primary ambiguity is not equal to zero, updating the one primary ambiguity and a smoothed offset value using the change to the one primary ambiguity.

19. The method of claim 11, wherein the wide-lane ambiguities and primary ambiguity are resolved when they do not change over a predetermined number of measurement epochs after being rounded to nearest integers.

* * * * *